2,804,485
Patented Aug. 27, 1957

2,804,485
PROCESS FOR PREPARING SUBSTITUTED AZULENES

Karl Ziegler and Klaus Hafner, Mulheim an der Ruhr, and Helmut Weides, Dusseldorf-Benrath, Germany No Drawing. Application March 6, 1956, Serial No. 569,694

Claims priority, application Germany March 7, 1955

14 Claims. (Cl. 260—666)

This invention relates to a process for preparing substituted azulenes.

The prior known processes for the production of azulenes substituted in the 7-membered ring are based on the preparation of compounds which are usually quite difficult to obtain, such as indenes substituted in the 6-membered ring, which are converted by ring extension and dehydrogenation into the corresponding azulenes, or bicyclic decanones, which are transformed by means of Grignard compounds into the decahydroazulenes which are substituted in the 7-membered ring. All these syntheses as well as the direct synthesis of 4,7-dimethyl azulene recently described by W. Treibs and R. Klimke (Ber. d. Deutschen Chemischen Gesellschaft 87, 212, 1954), take place with unsatisfactory and frequently very poor yields.

It has been found that azulenes which are substituted by hydrogen in at least one of the positions 4 and 8 are capable of adding metal-alkyls, -aryls and -aralkyls in the 4- and 8-positions, and that azulenes of the type specified can consequently be transformed into azulenes being substituted in at least one of the positions 4 and 8 by a substituent of the group consisting of the alkyl-, aralkyl- and aryl-radicles by reacting an azulene being unsubstituted in at least one of the 4- and 8-positions with a compound of the group consisting of the metal-alkyls, -aralkyls and -aryls, treating the addition product thus obtained with a compound containing an acid hydrogen atom and subjecting the dihydroazulene thus obtained to a dehydrogenation procedure.

In the first step of our process addition products of the azulenes used as starting materials and of the metal-alkyls, -aralkyls or -aryls are formed.

The metal-alkyls, -aryls and -aralkyls which are to be employed are primarily alkali metal alkyls, aryls and aralkyls. One may also use complex compounds such as aluminium tetraethyl or dilithium zinc tetraethyl. These complex compounds are to be understood herein as included in the terms "metal alkyls, aryls and aralkyls."

The complex compounds capable of reacting in accordance with the invention consist generally of alkali metal compounds of the aforementioned type and compounds of the type Me(R)$_n$, in which Me stands for aluminium, zinc, beryllium, magnesium, boron or another complex-forming metal, R for alkyl, aryl or aralkyl radicals and $n$ for the valancy stage of the metal compound. The terms "alkyl, aryl and aralkyl" as used herein also include substituted alkyl, aryl and aralkyl radicals.

The reaction of the azulenes unsubstituted in at least one of the positions 4 and 8 with the said metal compounds is preferably carried out in the presence of inert organic solvents, such as benzene, toluene, xylene or more especially ether. The addition generally takes place very readily, even at room temperature. The addition products are generally greyish-brown crystalline products.

In the second step of our process the said addition products are transformed into the corresponding dihydroazulenes.

The conversion of the addition products into the dihydroazulenes can be effected by treatment with alcohol, water or other compounds containing an acid hydrogen atom.

In the third step of our process the dihydroazulenes are dehydrogenated to the corresponding azulenes.

The dihydroazulenes are transformed even in the cold into the azulenes by treatment with dehydrogenation agents, such as for example chloranil. The dehydrogenation can however also be carried out by thermal decomposition in vacuo or by steam distillation, preferably in the presence of a hydrogen acceptor. The second and the third step of our process may be carried out as a one stage process by subjecting the addition products obtained by the first step of our process to a thermal decomposition or to steam distillation.

The following examples serve to illustrate our invention without limiting it thereto.

Example 1.—4-methyl-azulene 12.8 g. (1/10 mol) of azulene are dissolved in 50 ml. of absolute ether and the apparatus is filled with ultra-pure nitrogen. 120 ml. of an 0.86 molar ethereal lithium-methyl solution are added with exclusion of air and moisture to the centrifuged solution. The ether boils violently when the said solution is added. The colour of the solution changes slowly from blue to yellowish-brown, and a light brown precipitate is formed (dietherate of the addition products of lithium methyl with azulene). The reaction mixture is now cooled to —70° C. mixed with 10 ml. of absolute methanol (excess) and 30 g. of chloranil (excess), left for a short time at the low temperature and thereafter stirred for several hours at room temperature. The reaction solution, which has again become deep blue in colour, is diluted with hexane and washed with 4% caustic potash solution until the aqueous layer is colourless. The hexane layer is washed neutral with water, dried with CaCl$_2$ and then the solvent is distilled off. A blue oil is left as residue and the trinitrobenzolate thereof shows a melting point of 177–178° C. The light absorption shows inter alia strong maxima at 567, 617 and 579μμ. The yield of 4-methyl azulene is 9.7 g., which equals 68% of the theoretical.

The light-brown precipitate, the dietherate of the addition product of lithium-methyl with azulene, can also be suspended in absolute hexane in a nitrogen atmosphere and introduced dropwise into a continuous steam distillation process. Decomposition immediately takes place. The 4-methyl azulene formed is driven off with the steam and collected in a receiver, from which it is removed by shaking with hexane.

The dietherate of the addition product of lithium-methyl with azulene can also be thermally decomposed under high vacuum by heating to 50–150° C. The 4-methyl azulene is then distilled into a receiver cooled with liquid air.

The 4-methyl azulene obtained in both of the two last-mentioned cases has constants of the same values as those given in the literature.

Example 2.—4-butyl azulene 12.8 g. (1/10 mol) of azulene are dissolved in 100 ml. of absolute ether, the apparatus being filled with ultra-pure nitrogen. 125 ml. of an 0.785 molar lithium-butyl solution are slowly added to the mechanically stirred solution; the ether then boils violently and the blue colour of the solution immediately disappears. The reddish-brown solution is stirred for another hour at room temperature; some yellowish precipitate is formed. The reaction mixture is now cooled to —70° C., mixed with 10 ml. of absolute methanol and 25 g. of chloranil, left to stand for a short time at the low temperature and then stirred for several hours at room temperature. The reaction solution, which is again deep blue in colour, is diluted with hexane and washed with a 4% caustic potash solution until the aqueous layer is colourless. The hexane layer is washed neutral with water, dried over $CaCl_2$ and then the solvent is distilled off. As residue, 8.44 g. (=47% of the theoretical) of 4-butyl azulene are left in the form of a blue oil, the trinitrobenzolate of which melts at 93° C. The light absorption shows inter alia strong maxima at 680, 618, and 570 $\mu\mu$. The molecular weight of the blue oil was found to be 197 (calculated for butyl azulene: 184).

The addition product of azulene and lithium butyl can also be transformed by alcohol alone into the dihydro-4-butyl azulene. The ethereal solution is washed with water, dried and the solvent distilled off. The remaining light brown oil is dehydrogenated under high vacuum by heating to 50–150° C. The 4-butyl azulene which is formed is distilled into the receiver cooled with liquid air.

The same constants for 4-butyl azulene were found as in the first part of this example.

Example 3.—4-phenyl azulene 10 g. of azulene are mixed with 133 ml. of an 0.59 molar suspension of sodium phenyl in absolute benzene. Relatively strong heating occurs. The reaction mixture is stirred for a number of hours at room temperature. The originally blue solution becomes yellow and a large amount of precipitate is formed. It is now worked up in the same way as described in Examples 1 and 2. A blue oil is obtained, the trinitrobenzolate of which melts at 86–87° C. The yield of 4-phenyl azulene is 8.3 g., which equals 52% of the theoretical.

If the azulene is reacted with lithium phenyl, 4-phenyl azulene is also obtained.

Example 4.—4-phenyl isopropyl azulene 8 g. of azulene are dissolved in an ultra-pure nitrogen atmosphere in 50 ml. of absolute ether and 220 ml. of an 0.29 molar potassium phenyl isopropyl are added. Violent boiling of the ether occurs; the blue solution is immediately bleached. After the reaction solution has been stirred for a relatively long time, the working up process is carried out in the manner described in Examples 1 and 2. A high viscous blue oil is obtained, this being 4-phenyl isopropyl azulene. The molecular weight was established as being 242 (calculated for 4-phenyl isopropyl azulene: 246).

Example 5.—4,8-diphenyl azulene 4-phenyl azulene (prepared in accordance with Example 3) is reacted a second time with lithium phenyl and worked up in the manner described in Examples 1 and 2.

From 3.93 g. of 4-phenyl azulene, there were obtained 2.44 g. (=45% of the theoretical) of 4,8-diphenyl azulene as fine blue crystals with the melting point of 91° C. The molecular weight was established as being 275.5 (calculated for 4,8-diphenyl azulene: 280).

Example 6.—4,8-dimethyl azulene

The 4-methyl azulene prepared according to Example 1 is reacted a second time with lithium methyl and worked up in the manner described in Examples 1 and 2. From 9.7 g. of 4-methyl azulene, there was obtained 5.5 g. (=52% of the theoretical) of 4,8-dimethyl azulene as fine violet crystals with a melting point of 69° C. The trinitrobenzolate has a melting point of 178–179° C.

Example 7.—4-phenyl-8-methyl azulene 6.4 g. of 4-phenyl azulene (prepared according to Example 3) are reacted in the manner described with lithium methyl and then worked up. 4.2 g. (=62% of the theoretical) of 4-phenyl-8-methyl azulene are obtained.

Example 8.—4-ethyl azulene 14.3 g. of sodium-aluminum tetraethyl are dissolved in 100 ml. of absolute xylene in an ultra-pure nitrogen atmosphere, 8.7 g. of azulene are added and heated while stirring with reflux of the xylene. After two hours, the blue solution is bleached; the reaction mixture becomes reddish brown in colour. The xylene and the aluminum triethyl formed in the reaction are now distilled off in water-jet vacuum; a brown viscous mass is left. This is worked up with methanol and chloranil in the manner described in Examples 1 and 2. 4.8 g. (=45% of the theoretical) of 4-ethyl azulene are obtained in the form of a blue oil, the trinitrobenzolate of which melts at 147–148° C.

Example 9

12.8 g. of azulene (1/10 mol) are dissolved in 100 ml. of absolute dibutyl ether, 35 g. of boron-lithium tetraphenyl are added and the mixture heated under reflux while stirring. After some hours, the blue solution is bleached. This reaction solution is worked up in the manner described with alcohol and chloranil. 9.8 g. (=48% of the theoretical) of 4-phenyl azulene are obtained, the trinitrobenzolate of which melts at 86–87° C.

Example 10.—4-methyl azulene 6.4 g. of azulene (1/20 mol) are added under nitrogen to 170 ml. of an 0.3 molar solution of dilithium-zinc tetramethyl in absolute ether. The mixture is stirred for several hours until the blue solution is bleached. It is now worked up in the manner described in Examples 1 and 2. It is possible to isolate 4.7 g. (=66% of the theoretical) of 4-methyl azulene, the constants of which conform to the values described in the literature.

Example 11.—4-p-dimethylaminophenyl azulene 12.8 g. (0.1 mol) of azulene are dissolved in 100 ml. of absolute ether and reacted in the manner described in Example 1 with 75 ml. of a 1.343 molar solution of p-dimethylaminophenyl-lithium in absolute ether. A yellowish brown, finely crystalline precipitate is formed. The reaction mixture is worked up in the manner described in Examples 1 and 2. 16.13 g. (=65% of the theoretical) of 4-p-dimethylaminophenyl azulene are obtained as fine dark green needles with a melting point of 121–122° C. The trinitrobenzolate melts at 157° C.

Example 12.—4,8-di-p-dimethylaminophenyl azulene 8 g. of 4-p-dimethylaminophenyl azulene (prepared according to Example 11) are reacted a second time in the manner described with p-dimethylaminophenyl lithium. 5.5 g. (=47% of the theoretical) of 4,8-di-p-dimethylaminophenyl azulene are obtained as small dark green crystals with a melting point of 252–253° C.

What we claim is:

1. In a method of producing substituted azulenes, the step of reacting an azulene which is unsubstituted in at least one of the 4- and 8-positions with a metal compound selected from the group consisting of alkyl, aryl and aralkyl compounds of at least one metal of the first three groups of the periodic table.

2. In a method of producing substituted azulenes, the steps of reacting an azulene which is unsubstituted in at least one of the 4- and 8-positions with a metal compound selected from the group consisting of alkyl, aryl and aralkyl compounds of at least one metal of the first three groups of the periodic table, thereby forming an addition product; and treating said addition product with a compound containing an acid hydrogen atom.

3. In a method of producing substituted azulenes, the steps of reacting an azulene which is unsubstituted in at least one of the 4- and 8-positions with a metal compound selected from the group consisting of alkyl, aryl and aralkyl compounds of at least one metal of the first three groups of the periodic table, thereby forming an addition product; treating said addition product with a compound containing an acid hydrogen atom, thereby forming a dihydroazulene; and subjecting said dihydroazulene to a hydrogenation treatment so as to form the corresponding substituted azulene.

4. In a method of producing substituted azulenes, the step of reacting an azulene which is unsubstituted in at least one of the 4- and 8-positions with a metal compound selected from the group consisting of alkyl, aryl and aralkyl compounds of at least one metal of the first three groups of the periodic table in the presence of an inert organic solvent.

5. In a method of producing substituted azulenes, the steps of reacting an azulene which is unsubstituted in at least one of the 4- and 8-positions with a metal compound selected from the group consisting of alkyl, aryl and aralkyl compounds of at least one metal of the first three groups of the periodic table in the presence of an inert organic solvent, thereby forming an addition product; and treating said addition product with a compound containing an acid hydrogen atom.

6. In a method of producing substituted azulenes, the steps of reacting an azulene which is unsubstituted in at least one of the 4- and 8-positions with a metal compound selected from the group consisting of alkyl, aryl and aralkyl compounds of at least one metal of the first three groups of the periodic table in the presence of an inert organic solvent, thereby forming an addition product; treating said addition product with a compound containing an acid hydrogen atom thereby forming a dihydroazulene; and subjecting said dihydroazulene to a dehydrogenation treatment so as to form the corresponding substituted azulene.

7. In a method of producing substituted azulenes, the steps of reacting an azulene which is unsubstituted in at least one of the 4- and 8-positions with a metal compound selected from the group consisting of alkyl, aryl and aralkyl compounds of at least one metal of the first three groups of the periodic table, thereby forming an addition product; treating said addition product with a compound containing an acid hydrogen atom; and subjecting the thus formed product to steam distillation.

8. In a method of producing substituted azulenes, the steps of reacting an azulene which is unsubstituted in at least one of the 4- and 8-positions with a metal compound selected from the group consisting of alkyl, aryl and aralkyl compounds of at least one metal of the first three groups of the periodic table, thereby forming an addition product; treating said addition product with a compound containing an acid hydrogen atom, and subjecting the thus formed product to thermal decomposition.

9. In a method of producing substituted azulenes, the steps of reacting an azulene which is unsubstituted in at least one of the 4- and 8-positions with a metal compound selected from the group consisting of alkyl, aryl and aralkyl compounds of at least one metal of the first three groups of the periodic table in the presence of an inert organic solvent, thereby forming an addition product; treating said addition product with a compound containing an acid hydrogen atom; and subjecting the thus formed product to steam distillation.

10. In a method of producing substituted azulenes, the steps of reacting an azulene which is unsubstituted in at least one of the 4- and 8-positions with a metal compound selected from the group consisting of alkyl, aryl and aralkyl compounds of at least one metal of the first three groups of the periodic table, in the presence of an inert organic solvent, thereby forming an addition product; treating said addition product with a compound containing an acid hydrogen atom; and subjecting the thus formed product to thermal decomposition.

11. In a method of producing substituted azulenes, the step of reacting an azulene which is unsubstituted in at least one of the 4- and 8-positions with a metal compound selected from the group consisting of alkyl, aryl and aralkyl compounds of an alkali metal.

12. In a method of producing substituted azulenes, the step of reacting an azulene which is unsubstituted in at least one of the 4- and 8-positions with a complex alkyl of an alkali metal and a metal of the second and third groups of the periodic table.

13. In a method of producing substituted azulenes, the step of reacting an azulene which is unsubstituted in at least one of the 4- and 8-positions with a complex aryl of an alkali metal and a metal of the second and third groups of the periodic table.

14. In a method of producing substituted azulenes, the step of reacting an azulene which is unsubstituted in at least one of the 4- and 8-positions with a complex aralkyl of an alkali metal and a metal of the second and third groups of the periodic table.

References Cited in the file of this patent

Anderson et al.: Jour. Amer. Chem. Soc., vol. 73, 1951, pp. 232–235.

Gordon: Chemical Reviews, vol. 50, No. 1 (Feb. 1952), pp. 127–200.

Doering et al.: Jour. Amer. Chem. Soc., vol. 75, 1953, p. 2386.

Ziegler et al.: Liebigs Annalen der Chemie, Bande 485 (1931), page 174 only.

Brooks: Chemistry of the Nonbenzenoid Hydrocarbons (2nd ed.) (1950), page 465 only.